(12) United States Patent
Taylor (10) Patent No.: US 10,046,598 B2
(45) Date of Patent: Aug. 14, 2018

(54) WHEEL RIM (71) Applicant: Fredrick Taylor, Rome, GA (US)

(72) Inventor: Fredrick Taylor, Rome, GA (US)

(*) Notice: Subject to any disclaimer, the term of this patent is extended or adjusted under 35 U.S.C. 154(b) by 0 days.

(21) Appl. No.: 13/837,061

(22) Filed: Mar. 15, 2013

(65) Prior Publication Data

US 2014/0265537 A1    Sep. 18, 2014

(51) Int. Cl.
| | |
|---|---|
| *B60B 25/12* | (2006.01) |
| *B60B 25/20* | (2006.01) |
| *B60B 25/18* | (2006.01) |
| *B60B 25/10* | (2006.01) |
| *B60B 25/08* | (2006.01) |

(52) U.S. Cl.
CPC .............. *B60B 25/12* (2013.01); *B60B 25/10* (2013.01); *B60B 25/18* (2013.01); *B60B 25/20* (2013.01); *B60B 25/08* (2013.01)

(58) Field of Classification Search
CPC ......... B60B 25/04; B60B 25/08; B60B 25/14; B60B 25/18; B60B 25/10; B60B 25/12; B60B 25/20
USPC ....... 152/396, 401, 405, 406, 409, 410, 411, 152/DIG. 9; 301/11.1, 23, 35.3
See application file for complete search history.

(56) References Cited

U.S. PATENT DOCUMENTS

| | | | | |
|---|---|---|---|---|
| 1,880,403 A * | 10/1932 | Brink | ........................... | 152/410 |
| 2,357,000 A * | 8/1944 | Hollerith | ...................... | 152/406 |
| 2,817,383 A * | 12/1957 | Lafaye | .................... | B60B 25/22 |
| | | | | 152/409 |
| 3,599,698 A * | 8/1971 | Skehan et al. | ................ | 152/410 |
| 3,759,307 A * | 9/1973 | Walther et al. | ............... | 152/396 |
| 4,369,826 A * | 1/1983 | Hendrickson | ................ | 152/410 |
| 4,407,348 A * | 10/1983 | Suckow | ....................... | 152/410 |
| 4,554,961 A * | 11/1985 | Osawa et al. | ................. | 152/410 |
| 4,635,695 A * | 1/1987 | Frank et al. | .................. | 152/410 |
| 4,683,930 A * | 8/1987 | Elam et al. | ..................... | 152/410 |
| 4,706,723 A * | 11/1987 | Loeber et al. | ............... | 152/410 |
| 4,721,142 A * | 1/1988 | Foster | .......................... | 152/410 |
| 4,770,220 A * | 9/1988 | Mori | ............................ | 152/398 |
| 4,911,216 A * | 3/1990 | Yamoto et al. | ............... | 152/410 |
| 5,259,430 A * | 11/1993 | Smith et al. | .................. | 152/410 |
| 5,984,421 A * | 11/1999 | Proctor | ......................... | 301/23 |
| 6,311,749 B1 * | 11/2001 | Taylor | .......................... | 152/410 |
| 6,550,510 B2 * | 4/2003 | Champion | .................... | 152/410 |
| 6,568,764 B2 * | 5/2003 | McNeil | .................. | B60B 11/06 |
| | | | | 152/410 |

(Continued)

FOREIGN PATENT DOCUMENTS

| | | | |
|---|---|---|---|
| CA | 2287729 A1 * | 5/2000 | |
| DE | 1143408 B * | 2/1963 | ............ B60B 25/04 |

(Continued)

*Primary Examiner* — Kip T Kotter
(74) *Attorney, Agent, or Firm* — Thomas|Horstemeyer, LLP (57) ABSTRACT

In a multi-piece wheel rim assembly for ATV, RTV AND UTV industrial vehicle, the wheel assembly includes a rim base, removable flange and a lock ring. In various embodiments, the rim base and removable flange may be made from aluminum and the lock ring from steel. The lock ring may be made from a one or two piece construction. When the lock ring is made from two pieces, such as two pieces of steel, the lock ring may incorporate removable locking tabs to retain the lock ring within a recess formed in the rim base.

20 Claims, 6 Drawing Sheets

(56) References Cited

U.S. PATENT DOCUMENTS

| | | | |
|---|---|---|---|
| 6,786,259 B2 * | 9/2004 | Vehar et al. | 152/410 |
| 7,819,154 B2 * | 10/2010 | Durif | B60B 25/12 |
| | | | 152/409 |
| 8,814,276 B2 * | 8/2014 | Brown | B60B 25/14 |
| | | | 152/409 |
| 2014/0158265 A1 * | 6/2014 | Slanker et al. | 152/399 |

FOREIGN PATENT DOCUMENTS

| | | | | |
|---|---|---|---|---|
| GB | 354157 A | * | 8/1931 | B60B 25/18 |
| JP | 2006007959 A | * | 1/2006 | |
| JP | 2010018100 A | * | 1/2010 | |

* cited by examiner

WHEEL RIM

TECHNICAL FIELD

This disclosure concerns wheels for rough terrain industrial vehicles. More particularly, this disclosure concerns a multi-piece wheel rim for all terrain, rough terrain and utility vehicles.

BACKGROUND

Tires for vehicles designed for rough terrains are typically mounted on metal wheel rims that are essentially a one piece construction. Even if a multi-piece construction they are not designed for a vehicle operator to change a flat tire experienced while out in rough terrain. There is a need, therefore, for a wheel rim design that allows an operator of a vehicle designed for rough terrains to readily and easily change a flat tire while out in the rough terrain.

SUMMARY

The present disclosure addresses the problems associated with wheel rims mounted on vehicles designed for rough terrains. In particular, the present design provides a multi-piece wheel rim assembly that permits an operator of an industrial vehicle for rough terrains to be able to readily and easily change a flat tire while out in the rough terrain.

Briefly described, the present disclosure provides a multi-piece wheel rim designed to allow easy replacement of a tire for such a vehicle. In various non-limiting aspects, the wheel rim is a multi-piece lock ring design for vehicles for rough terrains. It may be used for pneumatic, tubeless tires. The vehicle may be an industrial vehicle such as an all-terrain vehicle (ATV), a rough terrain vehicle (RTV) or a utility vehicle (UTV).

Other systems, methods, features, and advantages of the present disclosure for a wheel rim will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2 depicts a rim base in the embodiment of FIG. 1.

FIG. 4 depicts an embodiment of a lock ring element of the multi-piece wheel rim of FIG. 1.

DETAILED DESCRIPTION

Described below are various embodiments of the present systems and methods for a wheel rim. Although particular embodiments are described, those embodiments are mere exemplary implementations of the system and method. One skilled in the art will recognize other embodiments are possible. All such embodiments are intended to fall within the scope of this disclosure. Moreover, all references cited herein are intended to be and are hereby incorporated by reference into this disclosure as if fully set forth herein. While the disclosure will now be described in reference to the above drawings, there is no intent to limit it to the embodiment or embodiments disclosed herein. On the contrary, the intent is to cover all alternatives, modifications and equivalents included within the spirit and scope of the disclosure.

Figure 1:
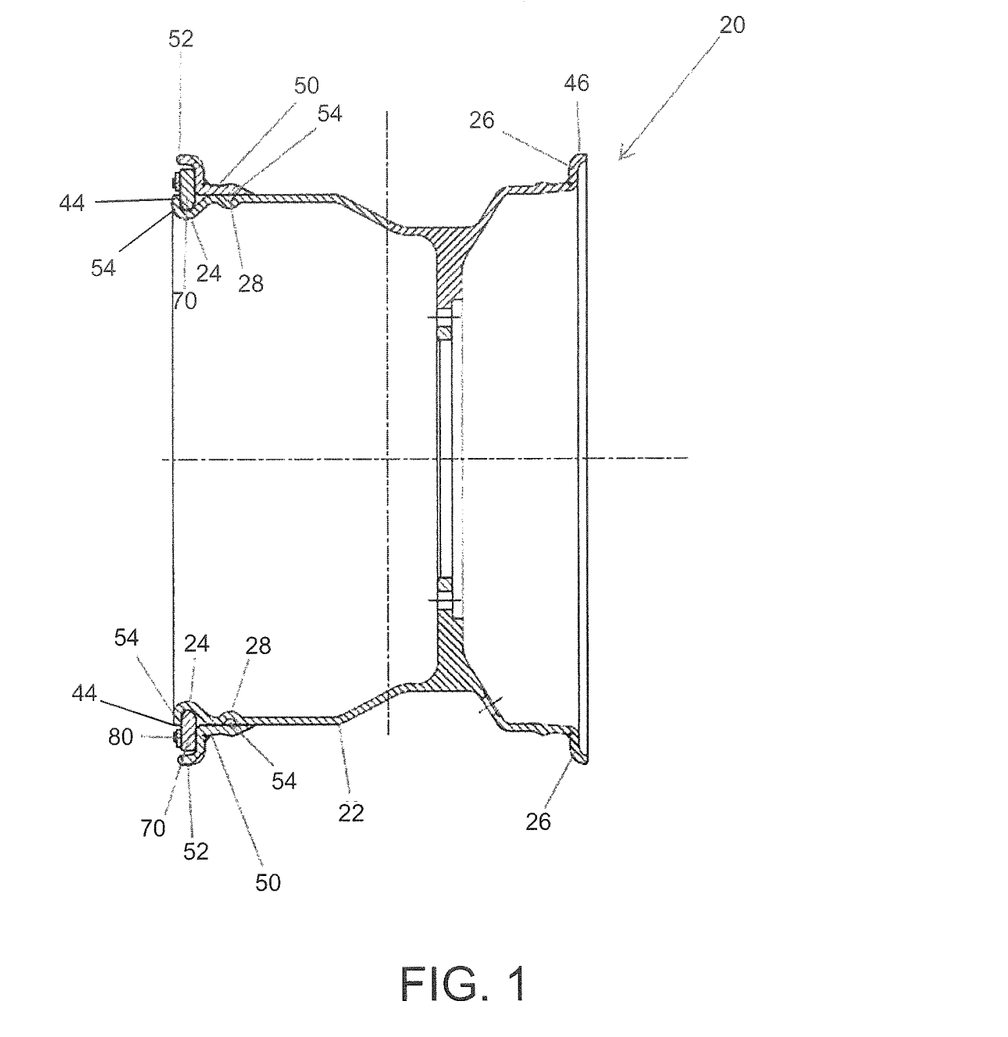
FIG. 1 is a cross-sectional view of a non-limiting embodiment of a multi-piece wheel rim of the present disclosure.
Figure 2A:
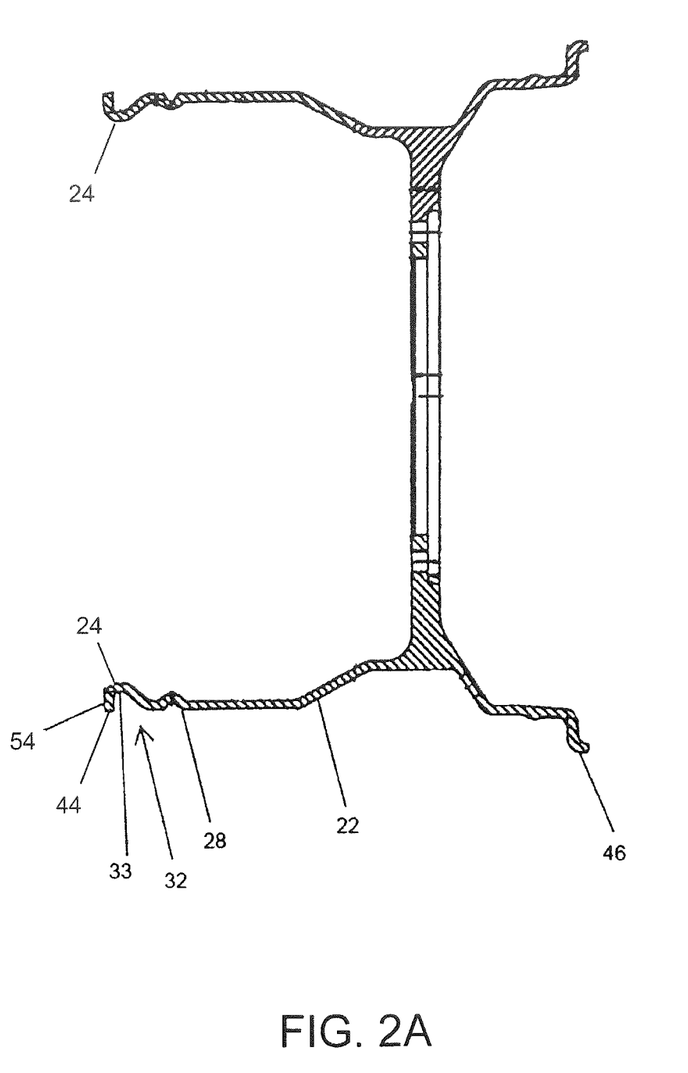
FIG. 2A is a cross-sectional view of the rim base.

Referring now in more detail to the drawings, in which like numerals indicate like parts throughout the several views, FIG. 1 illustrates a multi-piece wheel rim assembly 20 of a vehicle specifically designed for rough terrains. FIG. 2 illustrates an exemplary rim base 22 for the wheel rim assembly 20 of FIG. 1. The wheel rim assembly 20 includes the rim base 22, with the rim base including a first rim back flange 24. The rim base is substantially cylindrical and includes opposed first and second annular edges 44 and 46, with a rim front flange 26 positioned at annular edge 46 and extending radially from the rim base. The back flange 24, also known as the gutter section, defines or forms a recess 32 (FIG. 2A). Annular bead seat 50 telescopically extends about the back side of rim base 22 and includes a second rim back flange 52 that extends radially from the bead seat 50. Second rim back flange is spaced apart from and opposes first rim back flange 24, providing a space for receiving a lock ring 70. Rim base 22 may include an annular groove 28 spaced inwardly from recess 32. Groove 28 is configured to receive an O-ring 54. In various aspects annular groove 28 is configured to the shape of O-ring 54 for receiving O-ring 54.

A back side lock ring 70 is telescopically mounted about rim base 22 and is positioned adjacent the first rim back flange 24. Recess 32 is configured to receive the inner edge 74 of back side lock ring 70 within the recess 32. Recess 32 may be, but need not be, generally U-shaped. In one or more aspects the first rim back flange 24 has a first annular flange or leg portion 54 leading from the recess 32 that terminates at the first and second annular edges 44 of said rim base 22 and recess 32, the first annular flange or leg portion 54 having a five degree bearing surface with respect to a line perpendicular to the rim base.

Figure 3:
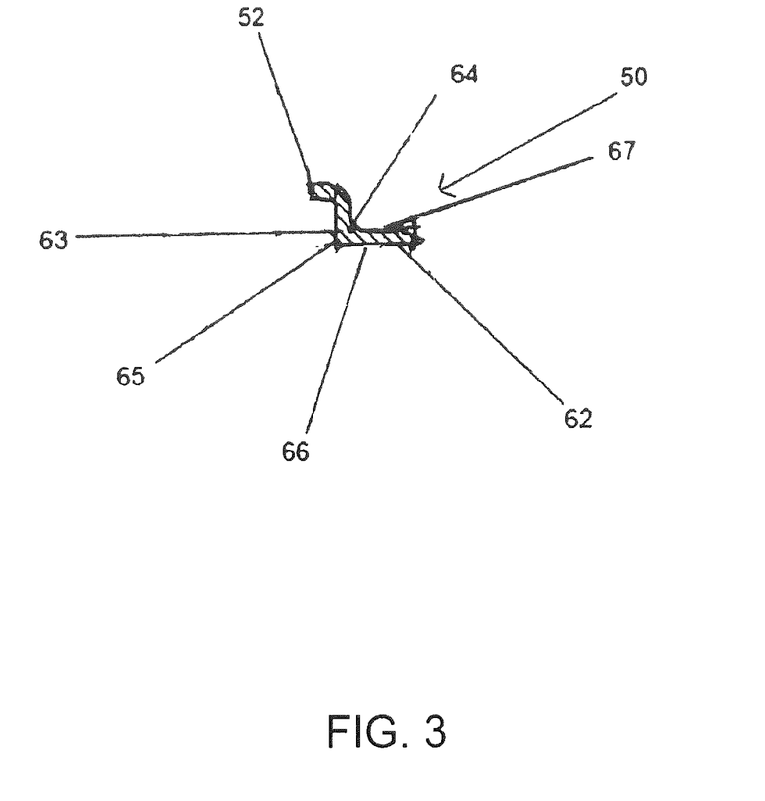
FIG. 3 depicts an embodiment of a back side rim element of the multi-piece wheel rim of FIG. 1.

A non-limiting embodiment of a back side rim element of the present wheel rim is depicted in the form of an annular bead seat 50. A cross-sectional view of the bead seat 50 is illustrated in FIG. 3. The bead seat 50 includes a support element 62 and curved, radially extending bead support leg 63. A concave surface 64 is formed on one side of the bead seat, and a convex surface 65 is formed on the other side of the bead seat at one end of the support element 62 at a junction between support element 62 and bead support leg 63. The inner surface 66 of the bead seat 50 functions as a bearing surface which bears against the rim base 22. The outer surface 67 on the concave side of the support element 62 and bead support leg 63 forms concave L-shaped bearing surface for engaging an annular bead of a tire. The bead seat 50 terminates into the second rim back flange 52 at its distal end opposite support element 62. Support element 62 axially extends along an outer surface of rim base 22, generally parallel thereto.

Figure 4A:
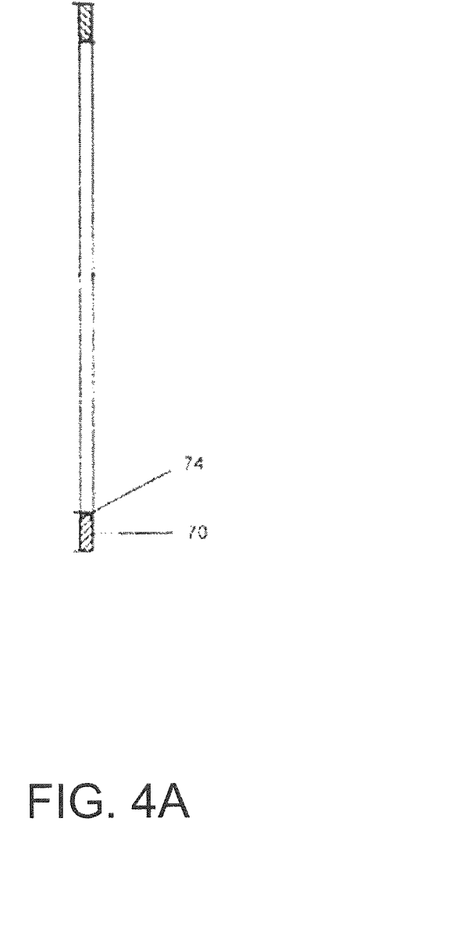
FIG. 4A depicts a cross-section of a non-limiting embodiment of a lock ring.
Figure 4B:
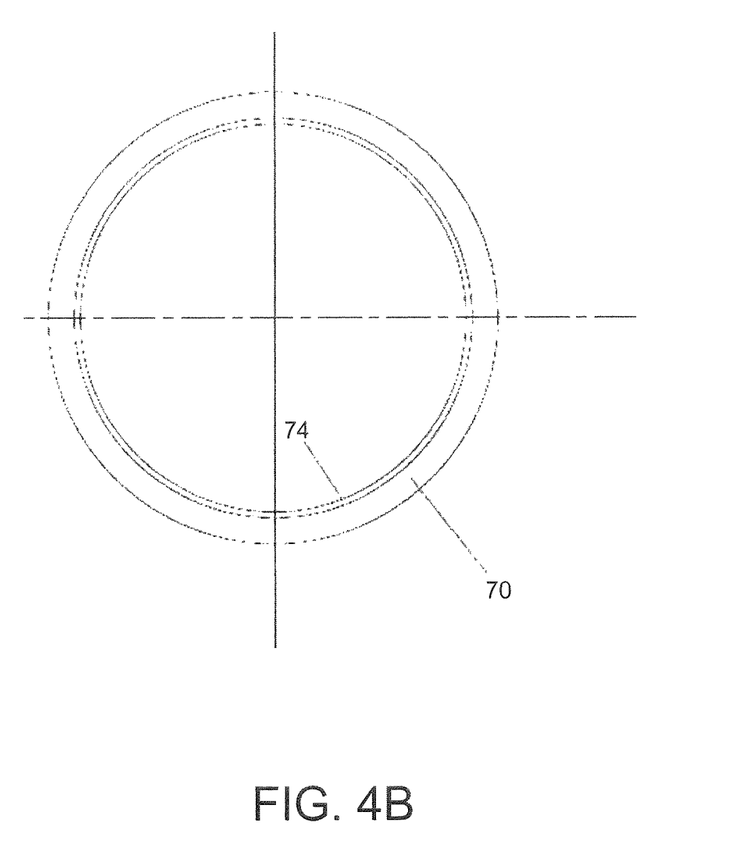
FIG. 4B depicts a side elevational view of the lock ring of FIG. 4A.

Illustrated in FIG. 4A, is a non-limiting embodiment of a cross-section of a lock ring 70 that can be utilized with respect to the recess 32, while FIG. 4B depicts a side elevational view thereof. The recess 32 adjacent the back flange 24 forms a generally concave U-shaped bearing surface 33 for receiving the lock ring 70. The lock ring 70 may be made from one or more pieces. For example, the lock ring may be a two piece construction with both pieces made of steel. When the lock ring 70 is made from two or more pieces, the lock ring may incorporate removable locking tabs to retain the lock ring within a recess 32 formed in the rim base 22.

If desired the amount of friction experienced from relative movement between the bead seat ring 50, the lock ring 70 and the rim base 22 can be controlled by the texture of the surfaces of the U-shaped bearing surface 33, the inside surface 74 of lock ring 70, and/or the opposed surfaces of rim base 22 and support element 62.

A locking mechanism 80 may be provided to secure locking ring 70 in place within recess 32 adjacent bead seat 50 as depicted in FIG. 1 when a tire has been installed on the wheel rim assembly 20. In one or more embodiments the locking mechanism 80 may be a series of connector bolts that may be threadly received by lock ring 70 and bead seat 50.

Figure 2B:
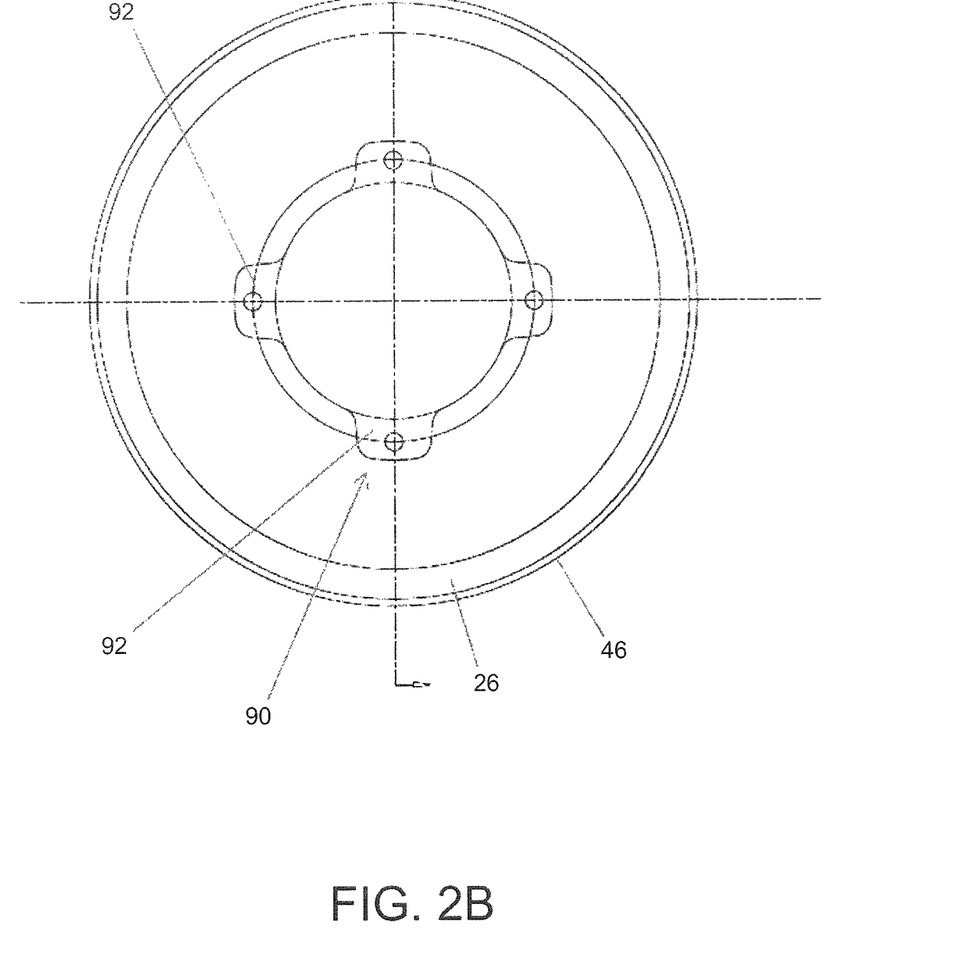
FIG. 2B is a side elevational view of the rim base taken from the right side of FIG. 2A.

Further, with reference to FIG. 2B, securing means 90 may be provided to secure wheel rim assembly 20 to an axle (not shown) of a vehicle. The securing means 90 may include one or more recesses 92 in the outside side of rim base 22 and holes for receiving, for example, a plurality of lug nuts.

The present wheel rim assembly may be used with, for example, a pneumatic, tubeless tire. In various aspects, the wheel rim base 22 including the first rim back flange 24 and the bead seat 50 including the second rim back flange 52 may be made of an aluminum composition, for example aluminum. The lock ring 70 may be made of a steel composition.

It will be noted that the present disclosure has been described as being incorporated in a five piece wheel rim assembly (including rim base 22, bead seat 50, lock ring 70, O-ring 54 and locking mechanism 80), but it should be understood that the invention can comprise other multiple piece wheel rims that have more than or less than five pieces.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A wheel rim assembly for a rough terrain vehicle comprising:
   a substantially cylindrical rim base including first and second annular edges, the first and second annular edges located at opposed edges of the rim base,
   a first rim back flange formed in the rim base adjacent the first annular edge of said rim base, said first rim back flange including a continuous annular recess having a an inner surface, the recess terminating at the first annular edge,
   the rim base further including an annular groove spaced inwardly of the first rim back flange recess,
   a bead seat mountable on an outer surface of said rim base in opposed relationship to the first rim back flange,
   the bead seat including a support element having an inner surface configured to rest on top of and in contact with at least a portion of the outer surface of the rim base and to extend axially along the at least a portion of the outer surface of the rim base and an outer surface opposite the inner surface, the outer surface configured to engage an annular bead of a tire such that the annular bead of the tire rests on top of and in contact with the outer surface of the support element, the bead seat support element extending over the annular groove in the rim base, the annular groove configured to receive an o-ring between the annular groove and the bead support element of the bead seat, and a bead support leg extending from a distal end of the bead seat support element outwardly from the rim base and terminating in a second rim back flange opposite the first rim back flange, the bead support leg including a bearing surface, the bearing surface of the bead support leg facing outwardly towards and opposed from the first annular edge,
   a back side lock ring mountable on said rim base, said back side lock ring received within said rim back flange recess and including a first surface bearing against said bearing surface of said bead support leg and a second surface on a side opposite the first surface and
   a removable locking mechanism configured to secure the lock ring in place within the rim base recess, the lock ring configured to receive the locking mechanism passing through the lock ring from one of the first surface and the second surface through the other of the first surface and the second surface, the bead support leg of the bead seat configured to fixedly receive the locking mechanism passing through the lock ring, the locking mechanism removably connecting the lock ring to the bead support leg of the bead seat.

2. The wheel rim assembly of claim 1, wherein the inner surface of said recess is a generally concave surface having non-parallel sides.

3. The wheel rim assembly of claim 1, wherein the rim base and the bead seat are made of an aluminum composition and the lock ring is made of a steel composition.

4. The wheel rim assembly of claim 1, the first rim back flange having a leg terminating at the first annular edge, the leg having an inner surface forming part of the inner surface of the recess for the lock ring, the inner surface of the leg of the first rim back flange configured to bear against the second surface of the lock ring opposite the first surface of the lock ring bearing against said bearing surface of said bead support leg, the inner bearing surface of the leg of the first rim back flange having an angle of 5 degrees with respect to a line perpendicular to the rim base.

5. The wheel rim assembly of claim 1, wherein the lock ring is constructed of two or more pieces.

6. The wheel rim assembly of claim 5, wherein the pieces are made of steel.

7. The wheel rim assembly of claim 1, wherein the first surface of the lock ring is configured to be retained against the bearing surface of said bead support leg.

8. The wheel rim assembly of claim 7, wherein the lock ring has a cross-section having a generally rectangular configuration including two opposed long sides, wherein at least one of the two opposed long sides is the first surface of the lock ring and is positioned to contact the bearing surface of said bead support leg.

9. The wheel rim assembly of claim 8, wherein the bead support leg extends substantially perpendicularly from the distal end of the bead seat support element outwardly from the rim base and the generally cross-sectional rectangular configuration of the lock ring is positioned substantially parallel to and in contact with said bead support leg.

10. The wheel rim assembly of claim 1, wherein the lock ring has a cross-section having a generally rectangular configuration including two opposed long sides and at least one of the two opposed sides long sides is the first surface of the lock ring and is positioned to contact the bearing surface of said bead support leg.

11. The wheel rim of claim 1, wherein the lock ring is a one piece circular element.

12. The wheel rim of claim 1, the first rim back flange having a leg terminating at the first annular edge, the leg having an inner surface for the lock ring, the inner surface of the leg of the first rim back flange configured to bear against the second surface of the lock ring opposite the first surface of the lock ring bearing against said bearing surface of said bead support leg, said recess having an inner surface opposite the inner surface of the first rim back flange leg that is at a non-parallel angle with respect to the surface of the leg of the first rim back flange.

13. A wheel rim assembly for a rough terrain vehicle comprising:
  a substantially cylindrical rim base including first and second annular edges, the first and second annular edges located at opposed edges of the rim base,
  a first rim back flange formed in the rim base adjacent the first annular edge of said rim base, said first rim back flange including a continuous annular recess having an inner surface, the recess terminating at the first annular edge,
  a bead seat mountable on an outer surface of said rim base in opposed relationship to the first rim back flange,
  the bead seat including a support element having an inner surface configured to extend axially along at least a portion of the outer surface of the rim base and an outer surface opposite the inner surface, the outer surface configured to engage an annular bead of a pneumatic tubeless tire such that the annular bead of the tire rests on top of and in contact with the outer surface of the support element, and a bead support leg extending from a distal end of the bead seat support element outwardly from the rim base and terminating in a second rim back flange opposite the first rim back flange, the bead support leg including a bearing surface, the bearing surface of the bead support leg facing outwardly, towards and opposed from the first annular edge,
  a back side lock ring mountable on said rim base, said back side lock ring received within said rim back flange recess and including a first surface bearing against said bearing surface of said bead support leg and a second surface on a side opposite the first surface, and
  a removable locking mechanism configured to secure the lock ring in place within the rim base recess, the lock ring configured to receive the locking mechanism passing through the lock ring from one of the first surface and the second surface through the other of the first surface and the second surface, the bead support leg of the bead seat configured to fixedly receive the locking mechanism passing through the lock ring, the locking mechanism removably fixing the lock ring to the bead support leg of the bead seat,
  wherein the wheel rim assembly is designed to receive and secure in place the pneumatic, tubeless tire for a vehicle selected from the group consisting of an all-terrain vehicle, a rough terrain vehicle and a utility vehicle.

14. The wheel rim assembly of claim 13, wherein the rim base and the bead seat are made of an aluminum composition and the lock ring is made of a steel composition.

15. The wheel rim assembly of claim 13, the first rim back flange having a leg terminating at the first annular edge, the leg having an inner surface forming part of the inner surface of the recess for the lock ring, the inner surface of the leg of the first rim back flange configured to bear against the second surface of the lock ring opposite the first surface of the lock ring bearing against said bearing surface of said bead support leg, the inner bearing surface of the leg of the first rim back flange having an angle of 5 degrees with respect to a line perpendicular to the rim base.

16. The wheel rim assembly of claim 13, wherein the lock ring is constructed of two or more pieces.

17. The wheel rim assembly of claim 16, wherein the pieces are made of steel.

18. The wheel rim assembly of claim 13, wherein the rim base further includes an annular groove spaced inwardly of the first rim back flange recess, the annular groove configured to receive an o-ring between the annular groove and the bead support element of the bead seat.

19. The wheel rim of claim 13, wherein the lock ring is a one piece circular element.

20. The wheel rim of claim 13, the first rim back flange having a leg terminating at the first annular edge, the leg having an inner surface for the lock ring, the inner surface of the leg of the first rim back flange configured to bear against the second surface of the lock ring opposite the first surface of the lock ring bearing against said bearing surface of said bead support leg, said recess having an inner surface opposite the inner surface of the first rim back flange leg that is at a non-parallel angle with respect to the surface of the leg of the first rim back flange.

\* \* \* \* \*